United States Patent
Edlund et al.

(10) Patent No.: US 7,601,302 B2
(45) Date of Patent: Oct. 13, 2009

(54) SELF-REGULATING FEEDSTOCK DELIVERY SYSTEMS AND HYDROGEN-GENERATING FUEL PROCESSING ASSEMBLIES AND FUEL CELL SYSTEMS INCORPORATING THE SAME

(75) Inventors: David J. Edlund, Bend, OR (US); R. Todd Studebaker, Bend, OR (US)

(73) Assignee: Idatech, LLC, Bend, OR (US)

(*) Notice: Subject to any disclaimer, the term of this patent is extended or adjusted under 35 U.S.C. 154(b) by 548 days.

(21) Appl. No.: 11/228,637

(22) Filed: Sep. 16, 2005

(65) Prior Publication Data

US 2007/0062116 A1  Mar. 22, 2007

(51) Int. Cl.
  G05D 7/00 (2006.01)
  G05B 9/00 (2006.01)
  G05D 16/00 (2006.01)
  F17D 3/00 (2006.01)
  H01M 8/18 (2006.01)

(52) U.S. Cl. ............... 422/110; 422/105; 422/111; 422/112; 422/114; 48/61; 48/127.9; 48/198.7; 48/190; 48/191; 429/19; 429/25

(58) Field of Classification Search ............... 48/61, 48/127.9, 198.7, 190, 191; 422/105, 110, 422/111, 112, 114; 429/19, 25

See application file for complete search history.

(56) References Cited

U.S. PATENT DOCUMENTS

| | | | |
|---|---|---|---|
| 1,306,221 A | 6/1919 | Ellis | |
| 1,782,824 A | 11/1930 | Hechenbleikner | |
| 1,848,466 A | 3/1932 | Edmonds | |
| 2,132,151 A | 10/1938 | Fenske et al. | |

(Continued)

FOREIGN PATENT DOCUMENTS

CA  1238866  7/1988

(Continued)

OTHER PUBLICATIONS

English-language abstract of Japanese Patent No. 57-145276, 1982.

(Continued)

*Primary Examiner*—Walter D Griffin
*Assistant Examiner*—Lessanework Seifu
(74) *Attorney, Agent, or Firm*—Dascenzo Intellectual Property Law, P.C.

(57) ABSTRACT

Feedstock delivery systems and hydrogen-producing fuel processing assemblies and fuel cell systems containing the same. The feedstock delivery systems include a liquid pump that draws at least one liquid feedstock from a supply and delivers at least one feed stream containing the feedstock(s) to a fuel processor, such as to the hydrogen-producing region thereof. The feedstock delivery system further includes a recycle conduit that establishes a fluid flow path for the liquid feedstock(s) from a location downstream of the pump back to a location upstream of the pump. In some embodiments, the feedstock delivery system further includes a flow restrictor associated with the recycle conduit and a pressure-actuated valve that selectively permits the recycled feedstock to bypass the flow restrictor. In some embodiments, the pump is configured to draw a greater flow rate of the feed stream from the supply than is delivered to the fuel processor.

12 Claims, 4 Drawing Sheets

U.S. PATENT DOCUMENTS

| | | | |
|---|---|---|---|
| 2,450,804 A | 10/1948 | Loy | |
| 2,609,059 A | 9/1952 | Benedict | |
| 2,824,620 A | 2/1958 | De Rosset | |
| 3,094,391 A | 6/1963 | Mader | |
| 3,144,312 A | 8/1964 | Mertens | |
| 3,208,198 A | 9/1965 | Rubin | |
| 3,336,730 A | 8/1967 | McBride et al. | |
| 3,338,681 A | 8/1967 | Kordesch | |
| 3,344,586 A | 10/1967 | Langley et al. | |
| 3,350,176 A | 10/1967 | Green et al. | |
| 3,356,538 A | 12/1967 | Miekka et al. | |
| 3,368,329 A | 2/1968 | Eguchi et al. | |
| 3,428,476 A | 2/1969 | Langley et al. | |
| 3,439,474 A | 4/1969 | McKinley | |
| 3,447,288 A | 6/1969 | Juda et al. | |
| 3,450,500 A | 6/1969 | Setzer et al. | |
| 3,469,372 A | 9/1969 | Yamauchi et al. | |
| 3,469,944 A | 9/1969 | Bocard et al. | |
| 3,486,301 A | 12/1969 | Bonnet | |
| 3,520,803 A | 7/1970 | Iaconelli | |
| 3,522,019 A | 7/1970 | Buswell et al. | |
| 3,524,819 A | 8/1970 | Guerrieri | |
| 3,534,531 A | 10/1970 | Eguchi et al. | |
| 3,564,819 A | 2/1971 | Neulander et al. | |
| 3,589,171 A | 6/1971 | Haley | |
| 3,655,448 A | 4/1972 | Setzer | |
| 3,665,680 A | 5/1972 | Heuser | |
| 3,713,270 A | 1/1973 | Farr et al. | |
| 3,761,382 A | 9/1973 | Hammond et al. | |
| 3,782,904 A | 1/1974 | Fletcher | |
| 3,787,038 A | 1/1974 | Tesner et al. | |
| 3,791,106 A | 2/1974 | Haley | |
| 3,837,146 A | 9/1974 | Faure et al. | |
| 3,839,110 A | 10/1974 | Shankoff | |
| 3,849,076 A | 11/1974 | Gryaznov et al. | |
| 3,881,891 A | 5/1975 | Goltsov et al. | |
| 3,881,897 A | 5/1975 | Faure et al. | |
| 3,920,416 A | 11/1975 | Houseman | |
| 3,955,941 A | 5/1976 | Houseman et al. | |
| 3,972,695 A | 8/1976 | Buckley et al. | |
| 3,980,452 A | 9/1976 | Krumm et al. | |
| 3,982,910 A | 9/1976 | Houseman et al. | |
| 4,003,343 A | 1/1977 | Lee | |
| 4,003,725 A | 1/1977 | Bunn, Jr. et al. | |
| 4,056,373 A | 11/1977 | Rubin | |
| 4,078,985 A | 3/1978 | Takeuchi | |
| 4,084,934 A | 4/1978 | Kumazawa | |
| 4,098,959 A | 7/1978 | Fanciullo | |
| 4,098,960 A | 7/1978 | Gagnon | |
| 4,127,393 A | 11/1978 | Timmins et al. | |
| 4,132,668 A | 1/1979 | Gryaznov et al. | |
| 4,134,739 A | 1/1979 | Gulden et al. | |
| 4,175,165 A | 11/1979 | Adlhart | |
| 4,197,152 A | 4/1980 | Palty et al. | |
| 4,214,969 A | 7/1980 | Lawrance | |
| 4,238,403 A | 12/1980 | Pinto | |
| 4,243,536 A | 1/1981 | Prölss | |
| 4,248,688 A | 2/1981 | Gartner et al. | |
| 4,254,086 A | 3/1981 | Sanders | |
| 4,302,177 A | 11/1981 | Fankhanel et al. | |
| 4,313,013 A | 1/1982 | Harris | |
| 4,315,893 A | 2/1982 | McCallister | |
| 4,319,923 A | 3/1982 | Falanga et al. | |
| 4,329,157 A | 5/1982 | Dobo et al. | |
| 4,331,520 A | 5/1982 | Juda et al. | |
| 4,349,613 A | 9/1982 | Winsel | |
| 4,381,641 A | 5/1983 | Madgavkar et al. | |
| 4,387,434 A | 6/1983 | Moncrief, Jr. et al. | |
| 4,400,182 A | 8/1983 | Davies et al. | |
| 4,417,905 A | 11/1983 | Banks et al. | |
| 4,422,911 A | 12/1983 | Juda et al. | |
| 4,430,304 A | 2/1984 | Spurrier et al. | |
| 4,444,158 A | 4/1984 | Yoon | |
| 4,466,253 A | 8/1984 | Jaster | |
| 4,468,235 A | 8/1984 | Hill | |
| 4,472,176 A | 9/1984 | Rubin | |
| 4,473,622 A | 9/1984 | Chludzinski et al. | |
| 4,483,690 A | 11/1984 | Marion et al. | |
| 4,504,447 A | 3/1985 | Spurrier et al. | |
| 4,533,607 A | 8/1985 | Sederquist | |
| 4,553,981 A | 11/1985 | Fuderer | |
| 4,567,857 A | 2/1986 | Houseman et al. | |
| 4,589,891 A | 5/1986 | Iniotakis et al. | |
| 4,613,436 A | 9/1986 | Wight et al. | |
| 4,642,273 A | 2/1987 | Sasaki | |
| 4,644,751 A | 2/1987 | Hsu | |
| 4,650,814 A | 3/1987 | Keller | |
| 4,654,063 A | 3/1987 | Auvil et al. | |
| 4,655,797 A | 4/1987 | Iniotakis et al. | |
| 4,657,828 A | 4/1987 | Tajima | |
| 4,659,634 A | 4/1987 | Struthers | |
| 4,670,359 A | 6/1987 | Beshty et al. | |
| 4,684,581 A | 8/1987 | Struthers | |
| 4,693,945 A | 9/1987 | Ohyauchi et al. | |
| 4,699,637 A | 10/1987 | Iniotakis et al. | |
| 4,713,234 A | 12/1987 | Weirich et al. | |
| 4,751,151 A | 6/1988 | Healy et al. | |
| 4,781,241 A | 11/1988 | Misage et al. | |
| 4,788,004 A | 11/1988 | Pinto et al. | |
| 4,810,485 A | 3/1989 | Marianowski et al. | |
| 4,820,594 A | 4/1989 | Sugita et al. | |
| 4,838,897 A | 6/1989 | Amano et al. | |
| 4,849,187 A | 7/1989 | Uozu et al. | |
| 4,865,624 A | 9/1989 | Okada | |
| 4,880,040 A | 11/1989 | Pierson et al. | |
| 4,904,455 A | 2/1990 | Karafian et al. | |
| 4,904,548 A | 2/1990 | Tajima | |
| 4,946,667 A | 8/1990 | Beshty | |
| 4,981,676 A | 1/1991 | Minet et al. | |
| 4,999,107 A | 3/1991 | Guerif | |
| 5,030,661 A | 7/1991 | Lywood | |
| 5,032,365 A | 7/1991 | Aono et al. | |
| 5,126,045 A | 6/1992 | Kohlheb et al. | |
| 5,139,541 A | 8/1992 | Edlund | |
| 5,158,581 A | 10/1992 | Coplan | |
| 5,205,841 A | 4/1993 | Vaiman | |
| 5,210,059 A | 5/1993 | Matturo et al. | |
| 5,215,729 A | 6/1993 | Buxbaum | |
| 5,217,506 A | 6/1993 | Edlund et al. | |
| 5,225,080 A | 7/1993 | Karbachsch et al. | |
| 5,226,928 A | 7/1993 | Makabe et al. | |
| 5,229,102 A | 7/1993 | Minet et al. | |
| 5,259,870 A | 11/1993 | Edlund | |
| 5,306,577 A | 4/1994 | Sprouse | |
| 5,326,550 A | 7/1994 | Adris et al. | |
| 5,335,628 A | 8/1994 | Dunbar | |
| 5,344,721 A | 9/1994 | Sonai et al. | |
| 5,354,547 A | 10/1994 | Rao et al. | |
| 5,376,167 A | 12/1994 | Broutin et al. | |
| 5,382,271 A | 1/1995 | Ng et al. | |
| 5,393,325 A | 2/1995 | Edlund | |
| 5,395,425 A | 3/1995 | Brown | |
| 5,401,589 A | 3/1995 | Palmer et al. | |
| 5,417,051 A | 5/1995 | Ankersmit et al. | |
| RE35,002 E | 7/1995 | Matsubara et al. | |
| 5,432,710 A | 7/1995 | Ishimaru et al. | |
| 5,449,848 A | 9/1995 | Itoh | |
| 5,458,857 A | 10/1995 | Collins et al. | |
| 5,498,278 A | 3/1996 | Edlund | |
| 5,500,122 A | 3/1996 | Schwartz | |
| 5,509,942 A | 4/1996 | Dodge | |
| 5,516,344 A | 5/1996 | Corrigan | |
| 5,518,530 A | 5/1996 | Sakai et al. | |
| 5,520,807 A | 5/1996 | Myrna et al. | |

| | | | | | | |
|---|---|---|---|---|---|---|
| 5,525,322 | A | 6/1996 | Willms | 6,350,297 | B1 | 2/2002 | Doyle et al. |
| 5,527,632 | A | 6/1996 | Gardner | 6,375,906 | B1 | 4/2002 | Edlund et al. |
| 5,536,405 | A | 7/1996 | Myrna et al. | 6,376,113 | B1 | 4/2002 | Edlund et al. |
| 5,536,488 | A | 7/1996 | Mansour et al. | 6,379,524 | B1 | 4/2002 | Lee et al. |
| 5,580,523 | A | 12/1996 | Bard | 6,383,670 | B1 | 5/2002 | Edlund et al. |
| 5,589,599 | A | 12/1996 | McMullen et al. | 6,395,405 | B1 | 5/2002 | Buxbaum |
| 5,612,012 | A | 3/1997 | Soma et al. | 6,458,189 | B1 | 10/2002 | Edlund et al. |
| 5,614,001 | A | 3/1997 | Kosaka et al. | 6,461,408 | B2 | 10/2002 | Buxbaum |
| 5,616,430 | A | 4/1997 | Aoyama | 6,494,937 | B1 | 12/2002 | Edlund et al. |
| 5,637,259 | A | 6/1997 | Galuszka et al. | 6,495,277 | B1 | 12/2002 | Edlund et al. |
| 5,637,414 | A | 6/1997 | Inoue et al. | 6,497,856 | B1 | 12/2002 | Lomax, Jr. et al. |
| 5,639,431 | A | 6/1997 | Shirasaki et al. | 6,537,352 | B2 | 3/2003 | Edlund et al. |
| 5,645,626 | A | 7/1997 | Edlund et al. | 6,547,858 | B1 | 4/2003 | Edlund et al. |
| 5,658,681 | A | 8/1997 | Sato et al. | 6,562,111 | B2 | 5/2003 | Edlund et al. |
| 5,677,073 | A | 10/1997 | Kawatsu | 6,569,227 | B2 | 5/2003 | Edlund et al. |
| 5,679,249 | A | 10/1997 | Fendya et al. | 6,596,057 | B2 | 7/2003 | Edlund et al. |
| 5,688,296 | A | 11/1997 | Andrus, Jr. et al. | 6,632,270 | B2 | 10/2003 | Edlund et al. |
| 5,705,082 | A | 1/1998 | Hinson | 6,660,069 | B2 | 12/2003 | Sato et al. |
| 5,705,916 | A | 1/1998 | Rudbeck et al. | 6,719,831 | B2 | 4/2004 | Edlund et al. |
| 5,712,052 | A | 1/1998 | Kawatsu | 6,719,832 | B2 | 4/2004 | Edlund et al. |
| 5,714,276 | A | 2/1998 | Okamoto | 6,723,156 | B2 | 4/2004 | Edlund et al. |
| 5,734,092 | A | 3/1998 | Wang et al. | 6,767,389 | B2 | 7/2004 | Edlund et al. |
| 5,738,708 | A | 4/1998 | Peachey et al. | 6,783,741 | B2 | 8/2004 | Edlund et al. |
| 5,741,474 | A | 4/1998 | Isomura et al. | 6,824,593 | B2 | 11/2004 | Edlund et al. |
| 5,741,605 | A | 4/1998 | Gillett et al. | 6,890,672 | B2 | 5/2005 | Dickman et al. |
| 5,759,712 | A | 6/1998 | Hockaday | 2003/0167690 | A1 | 9/2003 | Edlund et al. |
| 5,780,179 | A | 7/1998 | Okamoto | 2003/0192251 | A1* | 10/2003 | Edlund et al. ............... 48/127.9 |
| 5,782,960 | A | 7/1998 | Ogawa et al. | 2004/0003720 | A1 | 1/2004 | Beisswenger et al. |
| 5,795,666 | A | 8/1998 | Johnssen | 2004/0083890 | A1 | 5/2004 | Edlund et al. |
| 5,798,186 | A | 8/1998 | Fletcher et al. | 2004/0200459 | A1* | 10/2004 | Bennett et al. ............... 123/514 |
| 5,811,065 | A | 9/1998 | Sterenberg | 2005/0188843 | A1 | 9/2005 | Edlund et al. |
| 5,814,112 | A | 9/1998 | Elliott et al. | | | | |
| 5,821,185 | A | 10/1998 | White et al. | | | | |

FOREIGN PATENT DOCUMENTS

| | | | |
|---|---|---|---|
| 5,833,723 | A | 11/1998 | Kuwabara et al. |
| 5,858,314 | A | 1/1999 | Hsu et al. |
| 5,861,137 | A | 1/1999 | Edlund |
| 5,874,051 | A | 2/1999 | Heil et al. |
| 5,888,273 | A | 3/1999 | Buxbaum |
| 5,891,222 | A | 4/1999 | Hilgendorff et al. |
| 5,897,766 | A | 4/1999 | Kawatsu |
| 5,897,970 | A | 4/1999 | Isomura et al. |
| 5,904,754 | A | 5/1999 | Juda et al. |
| 5,931,987 | A | 8/1999 | Buxbaum |
| 5,932,181 | A | 8/1999 | Kim et al. |
| 5,938,800 | A | 8/1999 | Verrill et al. |
| 5,980,989 | A | 11/1999 | Takahashi et al. |
| 5,985,474 | A | 11/1999 | Chen et al. |
| 5,997,594 | A | 12/1999 | Edlund et al. |
| 5,998,053 | A | 12/1999 | Diethelm |
| 6,007,931 | A | 12/1999 | Fuller et al. |
| 6,042,956 | A | 3/2000 | Lenel |
| 6,045,772 | A | 4/2000 | Szydlowski et al. |
| 6,045,933 | A | 4/2000 | Okamoto |
| 6,054,229 | A | 4/2000 | Hsu et al. |
| 6,077,620 | A | 6/2000 | Pettit |
| 6,083,637 | A | 7/2000 | Walz et al. |
| 6,103,028 | A | 8/2000 | Juda et al. |
| 6,103,411 | A | 8/2000 | Matsubayashi et al. |
| 6,152,995 | A | 11/2000 | Edlund |
| 6,165,633 | A | 12/2000 | Negishi |
| 6,168,650 | B1 | 1/2001 | Buxbaum |
| 6,171,574 | B1 | 1/2001 | Juda et al. |
| 6,183,543 | B1 | 2/2001 | Buxbuam |
| 6,183,895 | B1 | 2/2001 | Kudo et al. |
| 6,187,066 | B1 | 2/2001 | Benz et al. |
| 6,190,623 | B1 | 2/2001 | Sanger et al. |
| 6,201,029 | B1 | 3/2001 | Waycuilis |
| 6,221,117 | B1 | 4/2001 | Edlund et al. |
| 6,231,831 | B1 | 5/2001 | Autenrieth et al. |
| 6,238,465 | B1 | 5/2001 | Juda et al. |
| 6,242,120 | B1 | 6/2001 | Herron |
| 6,319,306 | B1 | 11/2001 | Edlund et al. |
| 6,332,913 | B1 | 12/2001 | Breitschwerdt et al. |

| | | |
|---|---|---|
| EP | 0434562 A1 | 6/1991 |
| EP | 1065741 A2 | 1/2001 |
| JP | 45-14404 | 5/1970 |
| JP | 45-2642 | 9/1970 |
| JP | 57-145276 | 9/1982 |
| JP | 1-145302 | 6/1989 |
| JP | 1-145303 | 6/1989 |
| JP | 1-262903 | 10/1989 |
| JP | 4-163860 | 6/1992 |
| JP | 4-338101 | 11/1992 |
| JP | 6-134244 | 5/1994 |
| JP | 10-263372 | 10/1998 |
| WO | WO 97/25649 | 7/1997 |
| WO | WO 97/43796 | 11/1997 |
| WO | WO 99/30806 | 6/1999 |
| WO | WO 99/65097 | 12/1999 |
| WO | WO 00/04600 | 1/2000 |
| WO | WO 00/27507 | 5/2000 |
| WO | WO 01/12539 | 2/2001 |
| WO | WO 01/28662 | 4/2001 |
| WO | WO 01/64321 | 9/2001 |
| WO | WO 01/83086 | 11/2001 |

OTHER PUBLICATIONS

English-language abstract of Japanese Patent No. 1-145302, 1989.
English-language abstract of Japanese Patent No. 1-145303, 1989.
English-language abstract of Japanese Patent No. 1-262903, 1989.
English-language abstract of Japanese Patent No. 4-163860, Jun. 1992.
English-language abstract of Japanese Patent No. 432150, 1992.
English-language abstract of Japanese Patent No. 4-338101, 1992.
English-language abstract of Japanese Patent No. 5132301, 1993.
English-language abstract of Japanese Patent No. 5147902, 1993.
Engligh-language abstract of Japanese Patent No. 6040701, 1994.
English-language abstract of Japanese Patent No. 6-134244, 1994.
English-language abstract of Japanese Patent No. 6176779, 1994.
English-language abstract of Japanese Patent No. 6345408, 1994.
English-language abstract of Japanese Patent No. 710910, 1995.
English-language abstract of Japanese Patent No. 7057758, 1995.

English-language abstract of Japanese Patent No. 8-287932, 1996.
English-language abstract of German language PCT Patent Publication No. WO 97/43796, 1997.
English-language abstract of Great Britain Patent No. 2,305,186, 1997.
English-language abstract of Japanese Patent No. 10-263372, 1998.
English-language abstract of Japanese Patent No. 11116202, 1999.
English-language abstract of German language PCT Patent Publication Serial No. WO 00/04600, Jan. 2000.
English-language abstract of German language PCT Patent Publication No. WO 01/64321, 2001.
Adris, A. M., et al., "A Fluidized Bed Membrane Reactor for the Steam Reforming of Methane," The Canadian Journal of Chemical Engineering, vol. 69, pp. 1061-1070 (Oct. 1991).
Amphlett, J. C., et al., "On Board Hydrogen Purification for Steam Reformer/PEM Fuel Cell Vehicle Power Plants," Energy Progress X, Proceedings of the 10$^{th}$ World Hydrogen Energy Conference, Cocoa Beach, Florida, U.S.A., vol. 3, pp. 1681-1690 (Jun. 1994).
Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).
Chai, M., et al., "Promotion of Methane Steam Reforming Using Ruthenium-Dispersed Microporous Alumina Membrane Reactor," Chemistry Letters, The Chemical Society of Japan, pp. 41-44 (1993).
"Compact, Lightweight Fuel Reformer for Fuel Cells," Argonne National Laboratory/U.S. Department of Energy (Jul. 1996).
Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).
Edlund, David J. and William A. Pledger, "The Practical Use of Metal-Membrane Reactors for Industrial Applications," The 1995 Membrane Technology Reviews, pp. 89-97 (Nov. 1994).
Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).
Emonts, B., et al., "Compact Methanol Reformer Test for Fuel-Cell Powered Light-Duty Vehicles," Fifth Grove Fuel Cell Symposium, Commonwealth Institute, London, U.K., (no page No.), (Sep. 22-25, 1997).
Jørgensen, S. Lægsgaard, et al., "Application of Pd-Membranes for the Production of Pure Hydrogen in Methanol-Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51-57 (May 30-31, 1997).
Knapton, A. G., "Palladium Alloys for Hydrogen Diffusion Membranes," Platinum Metals Review, vol. 21, 44-50 (1977).
Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).
Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no page No.), (Sep. 22-25, 1997).
Minet, R. G., et al., "Experimental Studies of A Ceramic Membrane Reactor for the Steam/Methane Reaction at Moderate Temperatures (400-700° C.)," Symposium Chemistry, Inc., Meeting of American Chemical Society, San Francisco, California, U.S.A., pp. 245-248 (Apr. 1992).
Oertel, Michael, et al., "Steam Reforming of Natural Gas with Integrated Hydrogen Separation for Hydrogen Production," Chemical Engineering Technology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.
Shu, J., et al., "Catalytic Palladium-Based Membrane Reactors: A Review," The Canadian Journal of Chemical Engineering, vol. 69, pp. 1036-1060 (Oct. 1991).
Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).
Engineers Edge. "Basic Hydraulic Open Center System Schematic." 2000-2006.
Brennan, James R. "Combustion Gas Turbine Fuel Pumps." Imo Industries Inc., 1997.
d'Auria, A. et al. "Engineering Layouts for the CMS Gas System Modules." Feb. 20, 2001.
US 6,340,380, 01/2002, Frost et al. (withdrawn)

* cited by examiner

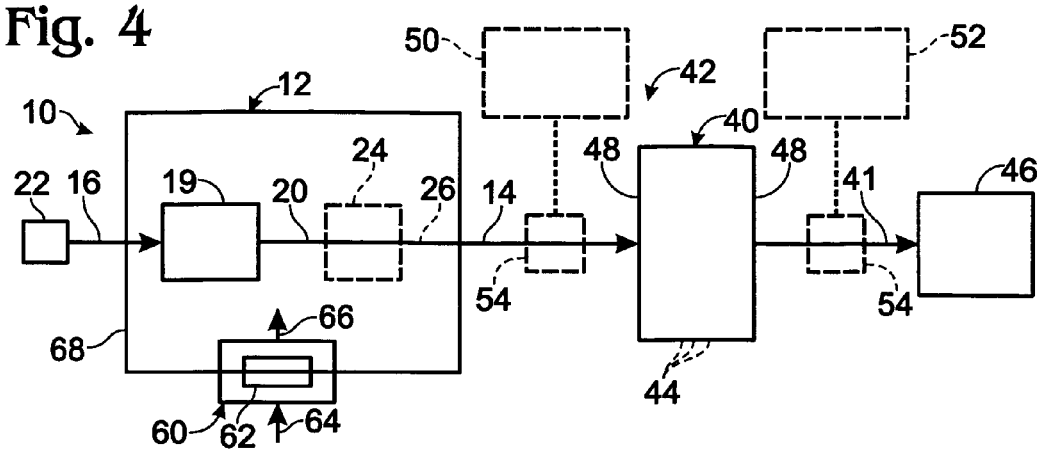
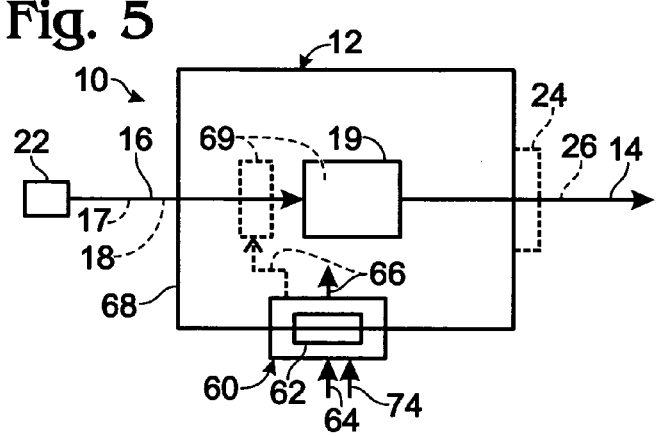
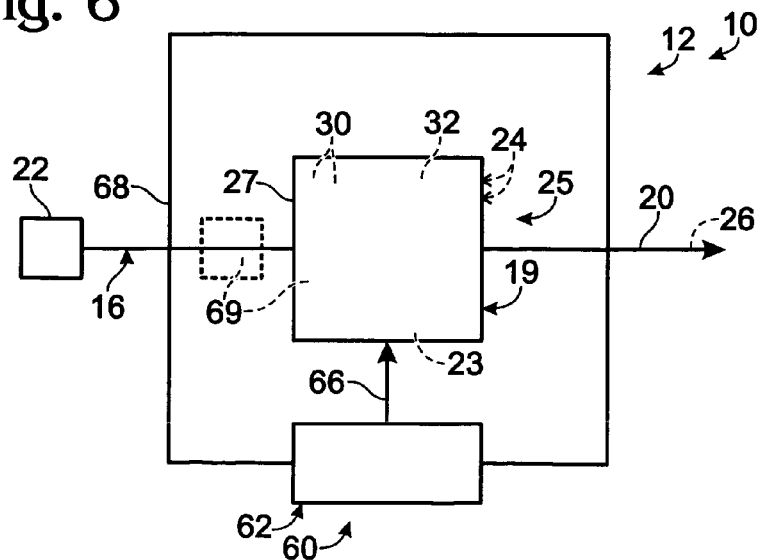

SELF-REGULATING FEEDSTOCK DELIVERY SYSTEMS AND HYDROGEN-GENERATING FUEL PROCESSING ASSEMBLIES AND FUEL CELL SYSTEMS INCORPORATING THE SAME

FIELD OF THE DISCLOSURE

The present disclosure relates generally to hydrogen-producing fuel processing assemblies and fuel cell systems, and more particularly to feedstock delivery systems therefor.

BACKGROUND OF THE DISCLOSURE

Purified hydrogen gas is used in the manufacture of many products including metals, edible fats and oils, and semiconductors and microelectronics. Purified hydrogen is also an important fuel source for many energy conversion devices. For example, many fuel cells use purified hydrogen and an oxidant to produce an electrical potential. A series of interconnected fuel cells is referred to as a fuel cell stack, and this stack may be referred to as a fuel cell system when combined with sources of oxidant and hydrogen gas. Various processes and devices may be used to produce the hydrogen gas that is consumed by the fuel cells.

A hydrogen-producing fuel processing assembly is an assembly of one or more devices or components that includes a fuel processor with a hydrogen-producing region that is adapted to convert one or more feedstocks into a product stream containing hydrogen gas as a majority component. In operation, the hydrogen-producing region is typically operated at an elevated temperature and pressure and contains a suitable catalyst to produce at least hydrogen gas from the feedstock(s) delivered thereto. The composition, flow rate, and properties of the feedstock(s) delivered to the hydrogen-producing region may affect the performance of the hydrogen-generation assembly. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen gases into water and electricity. In such fuel cells, the hydrogen gas is the fuel, the oxygen gas is the oxidant, and the water is the reaction product.

Fuel cells are typically coupled together to form a fuel cell stack. A hydrogen-producing fuel cell system is a system that includes a hydrogen-producing processing assembly that is adapted to produce hydrogen gas and a fuel cell stack that is adapted to receive hydrogen gas produced by the fuel processing assembly and to generate an electric current therefrom. When the flow rate of hydrogen gas to the fuel cell stack is affected by the flow rate of feedstock(s) to the hydrogen-producing region of the hydrogen-generation assembly, this may affect the performance of the fuel cell stack and/or its ability to satisfy an applied load thereto. Accordingly, hydrogen-producing fuel processing assemblies and hydrogen-producing fuel cell systems will typically include various controls for regulating the flow of feedstock to the hydrogen-producing region.

BRIEF DESCRIPTION OF THE DRAWINGS

FIG. 4 is a schematic diagram of a fuel cell system with a feedstock delivery system according to the present disclosure.

FIG. 5 is a schematic diagram of another fuel processing assembly with a feedstock delivery system according to the present disclosure.

FIG. 6 is a schematic view of another example of a fuel processing assembly that may be used with feedstock delivery systems according to the present disclosure.

DETAILED DESCRIPTION AND BEST MODE OF THE DISCLOSURE

Figure 1:
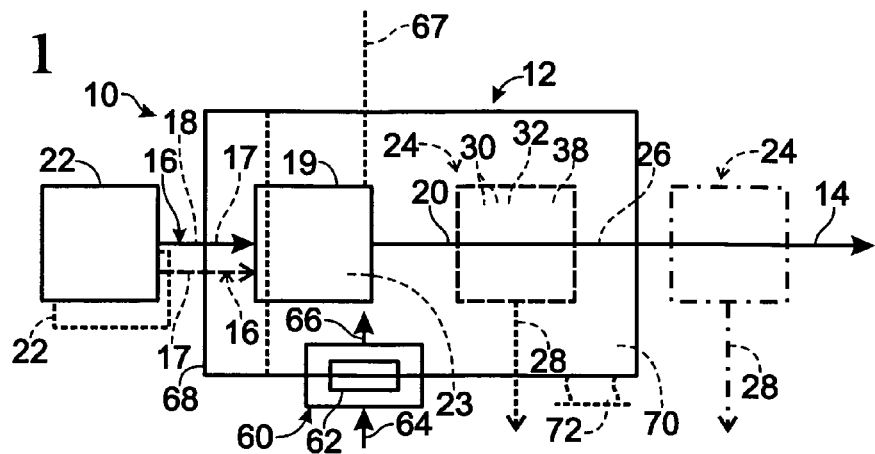
FIG. 1 is a schematic diagram of a fuel processing assembly with a feedstock delivery system according to the present disclosure.

A fuel processing assembly containing a feedstock delivery system 22 according to the present disclosure is shown in FIG. 1 and is indicated generally at 10. Fuel processing assembly 10 includes a fuel processor 12 that is adapted to produce a product hydrogen stream 14 containing hydrogen gas, and preferably at least substantially pure hydrogen gas, from one or more feed streams 16. Feed stream 16 may include at least one carbon-containing feedstock 18. Fuel processor 12 includes any suitable device, or combination of devices, that is adapted to produce hydrogen gas from feed stream(s) 16. Accordingly, fuel processor 12 includes a hydrogen-producing region 19, in which an output stream 20 containing hydrogen gas is produced by utilizing any suitable hydrogen-producing mechanism(s). Output stream 20 includes hydrogen gas as at least a majority component. Output stream 20 may include one or more additional gaseous components, and thereby may be referred to as a mixed gas stream that contains hydrogen gas as its majority component.

Examples of suitable mechanisms for producing hydrogen gas from feed stream(s) 16 delivered by feedstock delivery system 22 include steam reforming and autothermal reforming, in which reforming catalysts are used to produce hydrogen gas from a feed stream 16 containing a carbon-containing feedstock 18 and water 17. Other suitable mechanisms for producing hydrogen gas include pyrolysis and catalytic partial oxidation of a carbon-containing feedstock, in which case the feed stream does not contain water. Examples of suitable carbon-containing feedstocks 18 include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Figure 2:
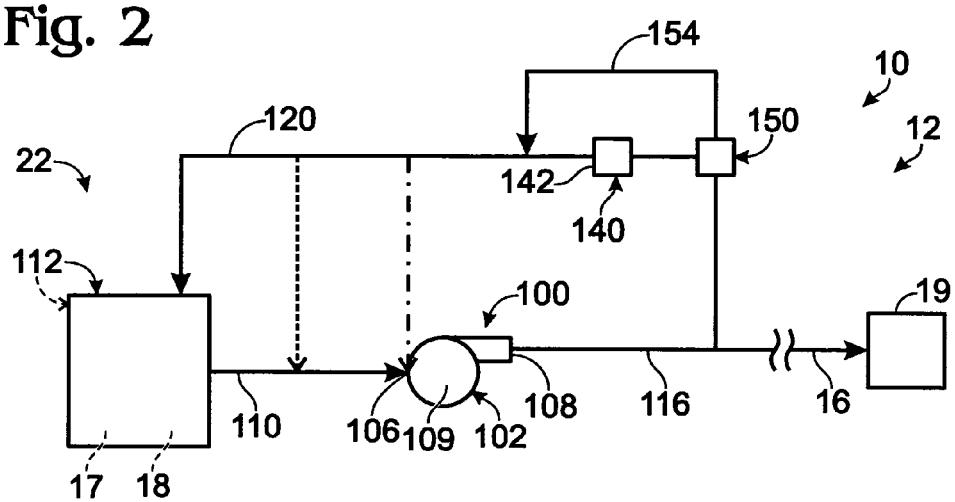
FIG. 2 is a schematic diagram of a feedstock delivery system according to the present disclosure.

According to the present disclosure, feedstock delivery system 22 is adapted to draw or otherwise receive a liquid carbon-containing feedstock from a supply, or source, and to deliver a feed stream 16 containing the feedstock for use in at least the hydrogen-producing region of the fuel processing assembly. Feedstock delivery system 22 may utilize any suitable delivery mechanism, such as a positive displacement or other suitable pump or mechanism for propelling liquid fluid streams. An illustrative, non-exclusive example of a feedstock delivery system 22 according to the present disclosure is shown in FIG. 2 and is adapted to deliver feed stream 16 to hydrogen-producing region 19 of the fuel processor 12 of fuel processing assembly 10. As shown, feedstock delivery system 22 includes a pump assembly 100 that includes at least one pump 102. Pump 102 includes an inlet 106 and an outlet 108, with the inlet being in fluid communication with a feedstock supply, or source, 112, and the outlet being in fluid communication with fuel processor 12. Pump 102 further includes a working portion, or pumping mechanism, 109 that is located generally between the pump's intake and outlet. Pump 102 is adapted to draw or otherwise receive a liquid stream 110 from supply 112 and to emit a liquid stream 116. Accordingly, feedstock delivery system 22 may be described as being adapted to pump a liquid stream containing at least one feedstock for hydrogen-producing region 19 from a liquid feedstock supply. Stream 110 may be referred to as an inlet stream or an intake stream, and stream 116 may be referred to as an outlet stream.

Pump 102 may be powered by any suitable power source; illustrative, non-exclusive examples of which include a component of hydrogen-producing fuel cell system 42, such as the subsequently described fuel cell stack 40 and/or energy storage device 52. Additional illustrative examples include a power supply that is independent of power output produced by the fuel cell system, such as an external, or dedicated, battery, an electrical grid, etc. While not required, pump 102 may be a single-speed, or single-output, pump that is adapted to either be in an on, or active, configuration in which the pump is receiving liquid stream 110 and emitting liquid stream 116, or an off, or unpowered, configuration in which the pump is not emitting stream 116. The actual output of the pump will vary with the voltage of the power output delivered to the pump, which may tend to vary.

As discussed, pump assembly 100 includes at least one pump. Accordingly, it is within the scope of the present disclosure that pump assembly 100 may include a single pump 102 or more than one pump 102. When the pump assembly includes more than one pump, the pumps may cooperate to draw liquid stream 110 and/or emit outlet stream 116. Additionally or alternatively, the pumps may each be adapted to draw a liquid stream 110 from the same or different sources 112 and/or to each emit an outlet stream 116 therefrom.

Supply 112 includes any suitable type and/or number of reservoirs and/or other sources from which the liquid stream may be drawn or otherwise received by an inlet 106 of a pump 102 of pump assembly 100. Illustrative, non-exclusive examples of suitable supplies 112 include tanks, canisters, and other liquid vessels, which may or may not be pressurized. Liquid stream 110 contains at least one component of feed stream 16, such as water 17 and/or a carbon-containing feedstock 18. As indicated in FIG. 2 in dashed lines, and as discussed herein, it is also within the scope of the present disclosure that stream 110 and/or supply 112 contain at least two different components of feed stream 16, such as water 17 and a liquid carbon-containing feedstock 18. Therefore, it is within the scope of the present disclosure that stream 110 may include a single component of feed stream 16, may contain more than one component of feed stream 16, and/or may include all of the component(s) of feed stream 16. The components of feed stream(s) 16 may also be referred to as feedstocks from which hydrogen-producing region 19 produces hydrogen gas.

As shown in FIG. 2, at least a portion of liquid outlet stream 116 may form feed stream 16. However, at least a portion of liquid stream 116 may additionally or alternatively be recycled to a location upstream of the pump's intake 106, such as to supply 112 or to the fluid conduit through which stream 110 flows from supply 112 to pump 102. As used herein, the terms "upstream" and "downstream" are measured with respect to the direction of fluid flow through the corresponding stream. The recycled portion 120 of liquid stream 116 is shown in a solid line being delivered back to supply 112 and in a dashed line being delivered to a fluid conduit containing stream 110. It is further within the scope of the present disclosure that recycle stream 120 may be recycled directly to the pump, such as at or proximate inlet 106, as indicated in FIG. 2 with a dash-dot line.

Figure 3:
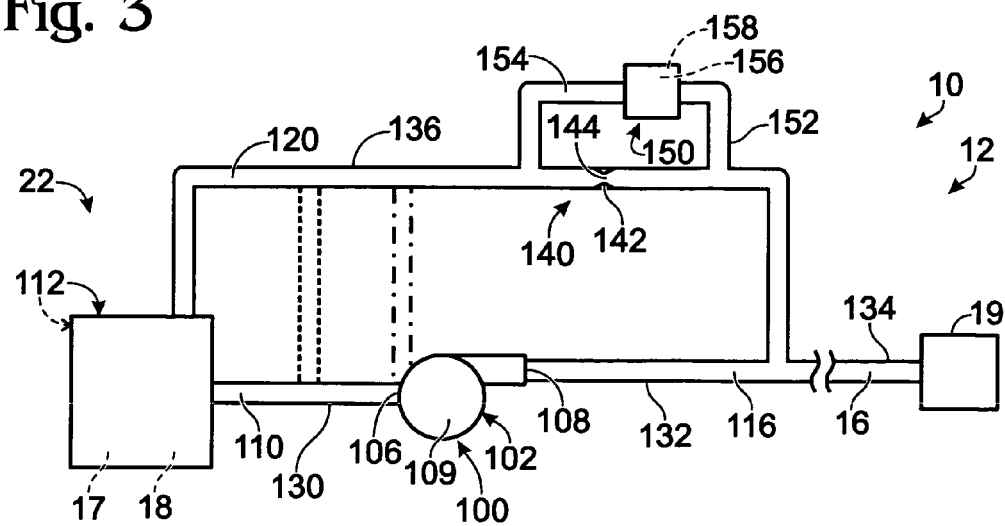
FIG. 3 is a schematic diagram of a feedstock delivery system according to the present disclosure.

Described in terms of the fluid conduits of, or associated with, feedstock delivery system 22, and as illustrated somewhat schematically in FIG. 3, the feedstock delivery system may be described as including an intake conduit 130 through which liquid stream 110 is drawn or otherwise received from supply 112 to pump 102. The feedstock delivery system further includes an outlet, or output, conduit 132 through which stream 116 is emitted from the pump's outlet 108. The output conduit is in fluid communication with a delivery conduit 134, through which at least a portion of stream 116 may be delivered to hydrogen-producing region 19 as at least a portion of feed stream 16. Feedstock delivery systems 22 according to the present disclosure further include a recycle conduit 136 that defines a fluid flow path that establishes fluid communication between the delivery conduit and a portion of the feedstock delivery system that is upstream of the pump's working portion 109. This portion of the recycle conduit may be referred to as the higher pressure region of the recycle conduit, and the portion of the recycle conduit downstream of the flow restrictor may be referred to as a lower pressure region of the recycle conduit. Expressed in slightly different terms, the recycle conduit may be described as including a first portion that extends in fluid communication between the outlet conduit and the flow restructure and defines a liquid flow path therebetween, and a second portion that extends in fluid communication between the flow restrictor and supply 112, inlet conduit 130 or another portion of the feedstock delivery system that is upstream from the working portion of the pump. The second portion of the recycle conduit similarly defines a liquid flow path between the flow restrictor and this upstream portion of the feedstock delivery system.

In the illustrative example shown in FIG. 3, the outlet conduit branches to establish fluid communication, or connections, with the recycle and delivery conduits. The fluid conduits described herein may include any suitable structure that defines a flow path for the liquid or other fluid streams described herein. Accordingly, the conduits should be formed from a suitable material, construction, and size for the fluid streams traveling therethrough and the operating conditions encountered thereby. The conduits have been schematically illustrated in FIG. 3, and it is within the scope of the present disclosure that they may (but are not required to) include, or be in communication with, additional structures and/or components, such as sensors, valves, flow-control devices, and the like.

Although not required to all embodiments, it is within the scope of the present disclosure that pump 102 is adapted to continuously draw stream 110 thereto and to emit liquid stream 116 therefrom, with it being within the scope of the present disclosure that the pump may be adapted to deliver a greater flow rate of stream 116 than is desired, or in some embodiments even able to be present in feed stream 16. Accordingly, the pump may be described as providing an output stream having a greater flow rate of liquid than the flow rate of feed stream 16 that is produced therefrom and delivered to the hydrogen-producing region (or other portion) of fuel processor 12. In such a configuration, the pump may be described as being configured to provide excess liquid, or excess flow rate, in output stream 116, thereby providing a flow of liquid that forms recycle stream 120.

By maintaining the pump in an operating state that provides an output stream 116 that contains a greater amount of feedstock than required by the hydrogen-producing region, the pump may be configured to maintain a constant output regardless of the hydrogen demand, or requirements of the hydrogen-producing region, at least when the hydrogen-producing region is in a hydrogen-producing operating state. In some embodiments, the pump may be configured to maintain a flow rate of liquid feedstock that exceeds the hydrogen-producing region's maximum demand for the feedstock (i.e., the demand for the feedstock when the hydrogen-producing region is at its maximum rated production rate and/or when the hydrogen-producing region is producing sufficient hydrogen gas to produce a power output at the maximum rated power output of the fuel cell stack). In some embodiments, the feedstock delivery system may be adapted to provide an output stream that has a flow rate that is at least 10%, at least 25%, or even at least 50% greater than the amount of feedstock required by the hydrogen-producing region. However, because of the self-regulating nature of the feedstock delivery system, the excess feedstock is not wasted, and instead is recycled through the feedstock delivery system, where it may be reused or returned to the feedstock supply.

In FIGS. 2 and 3, feedstock delivery system 22 further includes a flow restrictor 140 and a pressure-actuated valve 150. Flow restrictor 140 is adapted to reduce, or restrict, the cross-sectional area of recycle conduit 136. For example, and as schematically illustrated in FIG. 3, flow restrictor 140 may define a cross-sectional area for conduit 136 that is smaller than the cross-sectional area of delivery conduit 134. Accordingly, liquid stream 116 may be biased to flow through delivery conduit 134, and thereby to hydrogen-producing region 19, when the pressure in the hydrogen-producing region and/or delivery conduit 134 is less than the pressure in the recycle stream (at least between outlet conduit 132 and flow restrictor 140). Expressed in slightly different terms, flow restrictor 140 is adapted to create backpressure against recycle stream 120 flowing through the flow restrictor and through recycle conduit 136 back to the feedstock supply or other location upstream of the pump's working portion. The selected amount of backpressure created by the orifice may vary according to a variety of factors, such as one or more of user preferences, the size of the orifice, the shape of the orifice, the flow rate of liquid emitted by the pump assembly, the size of the delivery and recycle conduits, the composition and properties of the feed stream, etc. Preferably, the flow restrictor is sized or otherwise configured to provide, or maintain, a pressure that is greater than the selected, or desired, delivery pressure of feed stream 16 to hydrogen-producing region 19 and less than the subsequently described threshold delivery pressure and/or threshold recycle pressure.

Flow restrictor 140 may include any suitable structure that is configured to restrict the flow path of the recycle stream through recycle conduit 136. As an illustrative, non-exclusive example, the flow restrictor may include an orifice 142 having an opening 144 of smaller cross-sectional area than a portion of recycle conduit 136 upstream of the orifice and/or of smaller cross-sectional area than delivery conduit 134. An example of such an orifice is schematically illustrated in FIG. 3. Orifice 142 may be referred to as a restrictive orifice. Orifice 142 may have an opening having a fixed, or non-adjustable, size. Alternatively, the flow restrictor may include an orifice having a variable, or adjustable, opening size. When the orifice is configured to permit adjustment of its orifice size, it may be configured for manual adjustment of the orifice size, such as responsive to user inputs to a manual control element and/or responsive to electronic or other command signals from a controller or other portion of the fuel processing assembly and/or fuel cell system.

Pressure-actuated valve 150 is adapted to selectively permit the recycle stream to bypass the flow restrictor and thereby not be subjected to the backpressure created by the restrictive orifice 142 or other flow restrictor 140 and yet still be able to be returned to the supply or other portion of the feedstock delivery system that is upstream of the pump's working portion. Illustrative, non-exclusive examples of suitable pressure-actuated valves include pressure relief valves and check valves that are fluidly connected to as described herein, namely, to selectively restrict and permit liquid flow to a bypass conduit that enables the liquid to bypass the flow restrictor. As graphically indicated in FIG. 3, pressure-actuated valve 150 is in fluid communication with a bypass conduit 152 through which at least a portion of recycle stream 120 may selectively flow as a bypass stream 154 from a position upstream of the flow restrictor to a position downstream of the flow restrictor. Expressed in more structural terms, the pressure-actuated valve is adapted to selectively permit at least a portion of the recycle stream to flow from conduit 132 through the recycle conduit and back to supply 112 or inlet conduit 110 without having to flow through the flow restrictor. In FIG. 2, the pressure-actuated valve is schematically illustrated at the juncture between the bypass conduit and the recycle conduit upstream of the flow restrictor. However, it is within the scope of the present disclosure that the pressure-actuated valve may be located at any suitable location where it selectively permits and restricts flow to the flow restrictor, with the flow being diverted through the bypass conduit when the pressure-actuated valve restricts its flow to the flow restrictor. For example, FIG. 3 illustrates that the pressure-actuated valve may be located at an intermediate position along the bypass conduit (i.e., anywhere between the inlet and outlet of the bypass conduit). It is also within the scope of the present disclosure that the valve may be located at the inlet or exit of the conduit.

Pressure-actuated valve 150 is normally adapted, or biased, to restrict flow through bypass conduit 152 when the pressure in recycle stream 136 upstream of the flow restrictor (i.e., between output conduit 132 and flow restrictor 140) is less than a threshold recycle pressure. This configuration may be referred to as the closed, or flow-restricting, configuration of the pressure-actuated valve. However, when the pressure reaches (or exceeds) this threshold recycle pressure, the pressure-actuated valve is adapted to automatically permit liquid from upstream of orifice 140 to flow through bypass conduit 152.

When the pressure reaches (or exceeds) this threshold recycle pressure and the pressure-actuated valve is (automatically) configured to its actuated configuration responsive thereto, at least a portion of recycle stream 120 may flow through the bypass conduit, thereby reducing the pressure of the liquid upstream of the flow restrictor. This may also reduce the pressure of the feed stream delivered by the feedstock delivery system. The threshold recycle pressure may be the same as the maximum, or threshold, delivery pressure that is acceptable for feed stream 16. However, it is also within the scope of the present disclosure that these pressures are not the same. For example, the threshold recycle pressure may be selected to be less than the threshold delivery pressure, such as by a determined increment, to provide a buffer or pressure differential between the pressure at which the pressure-actuated valve is designed to permit flow through the bypass conduit (and thereby reduce the pressure in the delivery and other associated streams) and the maximum pressure at which the delivery conduit and/or fuel processing assembly is designed, or desired, to receive the feed stream.

As indicated herein, at least the hydrogen-producing region of fuel processing assembly 10 may be designed to operate at an elevated pressure, such as a pressure of at least 50 psi. When the fuel processing assembly includes a purification, or separation, region, such as described herein, this region may also be designed to operate at an elevated pressure. The particular maximum and minimum operating pressures for a particular fuel processing assembly will tend to vary according to a variety of possible factors. Illustrative examples of such factors may include, but may not be limited to, the hydrogen-producing reaction utilized in hydrogen-producing region 19, the composition of feed stream 16, the viscosity of the liquid in feed stream 16, the delivery conduit construction, size, and/or configuration, the construction of the fuel processing assembly, the pressure requirements of the fuel processing assembly and/or fuel cell system downstream from the hydrogen-producing region, design choices and tolerances, etc. For example, some fuel processing assemblies may be designed to maintain an elevated pressure in at least the hydrogen-producing region, and optionally at least one purification region thereof by utilizing a restrictive orifice or other suitable flow restrictor downstream of the hydrogen-producing region, and optionally downstream of a purification region that is also preferably maintained at an elevated pressure.

The amount of liquid (i.e., the percentage of recycle stream 120) that flows through conduit 152 may vary within the scope of the present disclosure. In some embodiments, the entirety of the stream that forms recycle stream 120 may flow through the bypass conduit when the pressure-actuated valve is in its actuated, or flow-permitted, configuration. In other embodiments, some of stream 120 may also flow through orifice 142 or other flow restrictor 140 even in periods in which the pressure-actuated valve is in this actuated configuration.

When present, pressure-actuated valve 150 may include a valve, or valve member, 156 and a biasing mechanism 158 that is adapted to bias the valve from its actuated configuration to its closed configuration. Biasing mechanism 150 may include any suitable structure or device adapted to provide the above-described biasing and yet permit the pressure-actuated valve to be configured to its actuated configuration when the threshold recycle pressure is reached, or exceeded. An illustrative, non-exclusive example of a suitable biasing mechanism is a spring or other resilient member that exerts a biasing force against the valve member in a direction that opposes the force exerted upon the pressure-actuated valve by the liquid in the recycle stream upstream of the flow restrictor. In other words, the liquid stream upstream from the flow restrictor may exert a force that urges the pressure-actuated valve from its closed configuration to its actuated configuration. This force is applied against the bias of, or the force exerted by, biasing mechanism 158. When the force exerted by the stream exceeds the force exerted by the biasing mechanism, the pressure-actuated valve is configured to its actuated configuration. Otherwise, when the stream pressure exerts a force to the pressure-actuated valve that is less than the force applied by the biasing mechanism, the pressure-actuated valve is adapted to remain in its closed configuration. Biasing mechanism 158 may also function as a pressure detector, or pressure sensor, that is adapted to detect when the pressure of the liquid stream emitted by the pump assembly exceeds a threshold pressure, such as a threshold recycle or delivery pressure. Specifically, when the pressure of the liquid, as applied against the biasing mechanism, is sufficient to overcome the force exerted by the biasing mechanism, then the threshold pressure is exceeded. Accordingly, the biasing mechanism may be adapted to exert a biasing force that sets or corresponds to the threshold pressure, such as the threshold recycle or delivery pressure.

Biasing mechanism 158 is preferably further adapted to automatically return the pressure-actuated valve to its closed configuration, such as when the pressure detected thereby (or applied thereto) decreases to below the threshold recycle pressure, when the pressure decreases to a level that is not sufficient to overcome the biasing force exerted by the biasing mechanism, and/or after a predetermined time period has elapsed since the pressure-actuated valve was configured to its actuated configuration. In other words, it is within the scope of the present disclosure that the pressure-actuated valve is configured to remain in its actuated configuration, once configured thereto, for at least a predetermined minimum time period. It is also within the scope of the present disclosure that the pressure-actuated valve may be configured to automatically transition between its actuated and closed configurations responsive entirely to the forces exerted thereto by the liquid steam and the biasing mechanism.

FIGS. 2 and 3 illustrate feedstock delivery systems 22 that include a flow restrictor and a pressure-actuated valve associated with the recycle stream of the feedstock delivery system. In operation, orifice 142 or another flow restrictor 140 is adapted to create backpressure that thereby urges, or biases, the output stream from the pump assembly to flow through delivery conduit 134 toward the hydrogen-producing region of the fuel processing assembly. However, should the orifice or other flow restrictor become clogged or otherwise fail, then the amount of backpressure created by the flow restrictor will increase and the portion of liquid outlet stream 116 that flows therethrough to form recycle stream 136 will decrease or even become zero, which corresponds to when there is no flow through the flow restrictor. If this pressure continues to increase, i.e., if the hydrogen-generation assembly remains in operation, there is a potential for injury or damage. For example, pressures that exceed the threshold delivery pressure and/or threshold recycle pressure may damage pump 102 or one or more portions of the fuel processing assembly. In essence, the pressure in at least output stream 116, and typically feed stream 16, and the portion of recycle stream 120 upstream from the flow restrictor, will continue to increase because the pump is configured to emit a greater flow of output stream 116 than is being consumed by hydrogen-producing region 19. Because the orifice or other flow restrictor is not able to permit the excess liquid, or sufficient quantities of the excess liquid, to flow therethrough to form recycle stream 120, the pressure will increase. However, because the above-described feedstock delivery systems also include a pressure-actuated valve 150, the pressure is prevented from increasing beyond a threshold recycle or delivery pressure. When the pressure-actuated valve is actuated, the pressure will decrease, at least until the pressure-actuated valve returns to its closed configuration. Should the flow restrictor continue to be clogged or otherwise inoperational or only partially operational, the pressure may begin to increase again, with the pressure-actuated valve again transitioning to its actuated configuration should the pressure again increase to or beyond the corresponding threshold pressure.

It is within the scope of the present disclosure that a feedstock delivery system 22 according to the present disclosure may not include both flow restrictor 140 and pressure-actuated valve 150. For example, the feedstock delivery system may include a flow restrictor 40, such as described herein, without a pressure-actuated valve (and accordingly without bypass conduit 152). As another example, the feedstock delivery system may include a pressure-actuated valve 150, such as described herein, without a flow restrictor that creates backpressure on the outlet stream and which is selectively bypassed using the pressure-actuated valve. In such an embodiment, the bypass conduit would not be present, and the pressure-actuated valve would selectively create backpressure to the outlet (and delivery) streams in its closed configuration, in which flow of the recycle stream is restricted by the pressure-actuated valve. When the pressure exceeds a threshold pressure, as described herein, the pressure-actuated valve is transitioned or otherwise urged to its actuated configuration, in which at least a portion of the outlet stream is recycled to supply 112 or another portion of the delivery system upstream of the pump's working portion.

As discussed, if system 22 does not include a pressure-actuated valve, there is a potential for the pressure to increase beyond selected threshold pressures if the flow restrictor fails, is clogged or otherwise is not able to properly function. However, system 22 and/or fuel processing assemblies and/or fuel cell systems containing feedstock delivery system 22 may include other suitable mechanisms for detecting and reacting to pressures that near or exceed a selected threshold pressure. For example, systems that include a controller may include a pressure sensor that is adapted to measure the pressure in output stream 116, upstream of flow restrictor 140, or in another suitable location, with the controller being adapted to control the operation of at least feedstock delivery system 22 responsive to a pressure that exceeds or nears a selected threshold.

As another example, if feedstock delivery system 22 is implemented without a flow restrictor, then pressure-actuated valve 150 will still be able to selectively reduce the pressure in output stream 116, feed stream 16, etc., responsive to when the pressure in these streams exceeds a selected threshold pressure, such as the above-discussed threshold recycle pressure or threshold delivery pressure. Because such a feedstock delivery system 22 does not include a flow restrictor that establishes some backpressure within system 22 while also permitting a recycle stream to flow therethrough, the pressure in the system will tend to oscillate. More specifically, the liquid pressure will tend to increase as the pump emits a greater flow rate of liquid than is consumed in hydrogen-producing region 19. This increase will tend to continue until the pressure-actuated valve is transitioned from its closed configuration to its actuated configuration. Thereafter, the pressure will tend to decrease until the pressure-actuated valve returns to its closed configuration, at which time the liquid pressure will tend to begin increasing again. This oscillation in the liquid pressure, such as the pressure of feed stream 16 may affect the flow rate of hydrogen gas produced by the fuel processor, which in turn may affect the power output produced by the fuel cell stack. The systems should still be operational, but may not be maintained in as steady, or constant, of operating state due to the pressure fluctuation, or oscillation, in the feedstock delivery system.

While a single feed stream 16 is shown in FIG. 1, it is within the scope of the disclosure that more than one stream 16 may be used and that these streams may contain the same or different feedstocks. This is schematically illustrated by the inclusion of a second feed stream 16 in dashed lines in FIG. 1. Similarly, FIG. 1 also illustrates in dashed lines that each feed stream 16 may (but is not required to be associated with a different feedstock delivery system 22, or portions thereof. For example, when more than one feedstock delivery system 22 is utilized, the systems may (but are not required to) draw at least a portion of their outlet streams from a common supply. When feed stream 16 contains two or more components, such as a carbon-containing feedstock and water, the components may be delivered in the same or different feed streams. For example, when the fuel processor is adapted to produce hydrogen gas from a carbon-containing feedstock and water, these components are typically delivered in separate streams, and optionally (at least until both streams are vaporized or otherwise gaseous), when they are not miscible with each other, such as shown in FIG. 1 by reference numerals 17 and 18 pointing to different feed streams.

When the carbon-containing feedstock is miscible with water, the feedstock is typically, but is not required to be, delivered with the water component of feed stream 16, such as shown in FIG. 1 by reference numerals 17 and 18 pointing to the same feed stream 16. For example, when the fuel processor receives a feed stream containing water and a water-soluble alcohol, such as methanol, these components may be premixed and delivered as a single stream. For example, a reforming feed stream may contain approximately 25-75 vol % methanol or ethanol or another suitable water-miscible carbon-containing feedstock, and approximately 25-75 vol % water. For feed streams formed (at least substantially) of methanol and water, the streams will typically contain approximately 50-75 vol % methanol and approximately 25-50 vol % water. Streams containing ethanol or other water-miscible alcohols will typically contain approximately 25-60 vol % alcohol and approximately 40-75 vol % water. An example of a particularly well-suited feed stream for hydrogen-generating assemblies that utilize steam reforming or autothermal reforming reactions contains 69 vol % methanol and 31 vol % water, although other compositions and liquid carbon-containing feedstocks may be used without departing from the scope of the present disclosure. While not required, it is within the scope of the present disclosure that such a feed stream that contains both water and at least one carbon-containing feedstock may be used as the feed stream for hydrogen-producing region 19 and as a combustible fuel stream for a heating assembly that is adapted to heat at least the hydrogen-producing region of the fuel processing assembly.

Steam reforming is one example of a hydrogen-producing mechanism that may be employed in hydrogen-producing region 19 in which feed stream 16 comprises water and a carbon-containing feedstock. In a steam reforming process, hydrogen-producing region 19 contains a suitable steam reforming catalyst 23, as indicated in dashed lines in FIG. 1. In such an embodiment, the fuel processor may be referred to as a steam reformer, hydrogen-producing region 19 may be referred to as a reforming region, and output, or mixed gas, stream 20 may be referred to as a reformate stream. As used herein, reforming region 19 refers to any hydrogen-producing region utilizing a steam reforming hydrogen-producing mechanism. Examples of suitable steam reforming catalysts include copper-zinc formulations of low temperature shift catalysts and a chromium formulation sold under the trade name KMA by Süd-Chemie, although others may be used. The other gases that are typically present in the reformate stream include carbon monoxide, carbon dioxide, methane, steam, and/or unreacted carbon-containing feedstock.

Another illustrative example of a suitable hydrogen-producing reaction that may be utilized in hydrogen-producing region 19 is autothermal reforming, in which a suitable autothermal reforming catalyst is used to produce hydrogen gas from water and a carbon-containing feedstock in the presence of air. When autothermal reforming is used, the fuel processor further includes an air delivery assembly 67 that is adapted to deliver an air stream to the hydrogen-producing region, as indicated in dashed lines in FIG. 1. Autothermal hydrogen-producing reactions utilize a primary endothermic reaction that is utilized in conjunction with an exothermic partial oxidation reaction, which generates heat within the hydrogen-producing region upon initiation of the initial hydrogen-producing reaction.

As an illustrative example of temperatures that may be achieved and/or maintained in hydrogen-producing region 19 through the use of a heating assembly 60, hydrogen-producing steam reformers typically operate at temperatures in the range of 200° C. and 900° C. Temperatures outside of this range are within the scope of the disclosure. Steam and autothermal reformers also tend to operate at elevated pressures, such as pressures in the range of 50 and 1000 psi, although pressures outside of this range may be used and are within the scope of the present disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C. It is within the scope of the present disclosure for the hydrogen-producing region to include two or more zones, or portions, each of which may be operated at the same or at different temperatures. For example, when the hydrogen-production fluid includes a hydrocarbon, in some embodiments it may be desirable to include two different hydrogen-producing portions, with one operating at a lower temperature than the other to provide a pre-reforming region. In such an embodiment, the fuel processing system may alternatively be described as including two or more hydrogen producing regions. Illustrative, non-exclusive examples of suitable heating assemblies for use with fuel processing assemblies according to the present disclosure are disclosed in U.S. patent applications Ser. Nos. 10/407,500 and 10/412,709, as well as in U.S. patent application Ser. No. 11/226,810, which was filed on Sep. 13, 2005, is entitled "Hydrogen-Producing Fuel Processing Assemblies, Heating Assemblies, and Methods of Operating the Same," and which claims priority to U.S. Provisional Patent Application Ser. No. 60/688,430. The complete disclosures of these applications are hereby incorporated by reference for all purposes.

In many applications, it is desirable for the fuel processor to produce at least substantially pure hydrogen gas. Accordingly, the fuel processor may utilize a process that inherently produces sufficiently pure hydrogen gas. When the output stream contains sufficiently pure hydrogen gas and/or sufficiently low concentrations of one or more non-hydrogen components for a particular application, product hydrogen stream 14 may be formed directly from output stream 20. However, in many hydrogen-producing processes, output stream 20 will be a mixed gas stream that contains hydrogen gas as a majority component along with other gases. Similarly, in many applications, the output stream 20 may be substantially pure hydrogen but still contain concentrations of one or more non-hydrogen components that are harmful or otherwise undesirable in the application for which the product hydrogen stream is intended to be used.

Fuel processing assembly 10 may (but is not required to) further include a purification region 24, in which a hydrogen-rich stream 26 is produced from the output, or mixed gas, stream. Hydrogen-rich stream 26 contains at least one of a greater hydrogen concentration than output stream 20 and a reduced concentration of one or more of the other gases or impurities that were present in the output stream. Purification region 24 is schematically illustrated in FIG. 1, where output stream 20 is shown being delivered to an optional purification region 24. As shown in FIG. 1, at least a portion of hydrogen-rich stream 26 forms product hydrogen stream 14. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, and/or consumed by the fuel processing assembly.

Purification region 24 may, but is not required to, produce at least one byproduct stream 28. When present, byproduct stream 28 may be exhausted, sent to a burner assembly or other combustion source, used as a heated fluid stream, stored for later use, or otherwise utilized, stored or disposed of. It is within the scope of the disclosure that byproduct stream 28 may be emitted from the purification region as a continuous stream responsive to the delivery of output stream 20 to the purification region, or intermittently, such as in a batch process or when the byproduct portion of the output stream is retained at least temporarily in the purification region.

Purification region 24 includes any suitable device, or combination of devices, that are adapted to reduce the concentration of at least one component of output stream 20. In most applications, hydrogen-rich stream 26 will have a greater hydrogen concentration than output, or mixed gas, stream 20. However, it is also within the scope of the disclosure that the hydrogen-rich stream will have a reduced concentration of one or more non-hydrogen components that were present in output stream 20, yet have the same, or even a reduced overall hydrogen concentration as the output stream. For example, in some applications where product hydrogen stream 14 may be used, certain impurities, or non-hydrogen components, are more harmful than others. As a specific example, in conventional fuel cell systems, carbon monoxide may damage a fuel cell stack if it is present in even a few parts per million, while other non-hydrogen components that may be present in stream 20, such as water, will not damage the stack even if present in much greater concentrations. Therefore, in such an application, a suitable purification region may not increase the overall hydrogen concentration, but it will reduce the concentration of a non-hydrogen component that is harmful, or potentially harmful, to the desired application for the product hydrogen stream.

Illustrative examples of suitable devices for purification region 24 include one or more hydrogen-selective membranes 30, chemical carbon monoxide removal assemblies 32, and pressure swing adsorption systems 38. It is within the scope of the disclosure that purification region 24 may include more than one type of purification device, and that these devices may have the same or different structures and/or operate by the same or different mechanisms. As discussed, hydrogen-producing fuel processing assembly 10 may include at least one restrictive orifice or other flow restrictor downstream of at least one purification region, such as associated with one or more of the product hydrogen stream, hydrogen-rich stream, and/or byproduct stream.

Hydrogen-selective membranes 30 are permeable to hydrogen gas, but are at least substantially, if not completely, impermeable to other components of output stream 20. Membranes 30 may be formed of any hydrogen-permeable material suitable for use in the operating environment and parameters in which purification region 24 is operated. Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically formed from a thin foil that is approximately 0.001 inches thick. It is within the scope of the present disclosure, however, that the membranes may be formed from other hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,221,117, 6,319,306, and 6,537,352, the complete disclosures of which are hereby incorporated by reference for all purposes.

Chemical carbon monoxide removal assemblies 32 are devices that chemically react carbon monoxide and/or other undesirable components of stream 20, if present in output stream 20, to form other compositions that are not as potentially harmful. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing assembly 10 may include more than one type and/or number of chemical removal assemblies 32.

Pressure swing adsorption (PSA) is a chemical process in which gaseous impurities are removed from output stream 20 based on the principle that certain gases, under the proper conditions of temperature and pressure, will be adsorbed onto an adsorbent material more strongly than other gases. Typically, it is the impurities that are adsorbed and removed from output stream 20. The success of using PSA for hydrogen purification is due to the relatively strong adsorption of common impurity gases (such as $CO$, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are removed from stream 20 along with other impurities. If the adsorbent material is going to be regenerated and these impurities are present in stream 20, purification region 24 preferably includes a suitable device that is adapted to remove these impurities prior to delivery of stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. Other suitable adsorbent material compositions, forms, and configurations may be used.

PSA system 38 also provides an example of a device for use in purification region 24 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 24 is shown within fuel processor 12. It is within the scope of the disclosure that region 24, when present, may alternatively be separately located downstream from the fuel processor, as is schematically illustrated in dash-dot lines in FIG. 1. It is also within the scope of the disclosure that purification region 24 may include portions within and external fuel processor 12.

In the context of a fuel processor, or fuel processing assembly, that is adapted to produce a product hydrogen stream that will be used as a feed, or fuel, stream for a fuel cell stack, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors and fuel processing assemblies, including illustrative (non-exclusive) examples of components and configurations therefor for producing streams of at least substantially pure hydrogen gas are disclosed in U.S. Pat. Nos. 6,319,306, 6,221,117, 5,997,594, 5,861,137, and pending U.S. Patent Publication Nos. 2001/0045061, 2003/0192251, and 2003/0223926. The complete disclosures of the above-identified patents and patent applications are hereby incorporated by reference for all purposes.

In FIG. 1, fuel processor 12 is shown including a shell 68 in which at least the hydrogen-producing region, and optionally the purification region, is contained. Shell 68, which also may be referred to as a housing, enables the components of the steam reformer or other fuel processing mechanism to be moved as a unit. It also protects the components of fuel processor 12 from damage by providing a protective enclosure and reduces the heating demand of the fuel processing assembly because the components of the fuel processor may be heated as a unit. Shell 68 may, but does not necessarily, include insulating material 70, such as a solid insulating material, blanket insulating material, and/or an air-filled cavity. It is within the scope of the disclosure, however, that the fuel processor may be formed without a housing or shell. When fuel processor 12 includes insulating material 70, the insulating material may be internal the shell, external the shell, or both. When the insulating material is external a shell containing the above-described reforming and/or purification regions, fuel processor 12 further may include an outer cover or jacket 72 external the insulation, as schematically illustrated in FIG. 1. It is within the scope of the present disclosure that the fuel processing assembly may be implemented with a different shell, with a shell that includes additional components of the fuel processing assembly, including feedstock delivery system 22 (or portions thereof), and/or includes additional components of the fuel cell system. It is also within the scope of the present disclosure that a fuel processing assembly 10 may not include a shell 68.

It is further within the scope of the disclosure that one or more of the components of fuel processing assembly 10 may either extend beyond the shell or be located external at least shell 68. For example, and as discussed, purification region 24 may be located external shell 68, such as with the purification region being coupled directly to the shell (as schematically illustrated in FIG. 5) or being spaced-away from the shell but in fluid communication therewith by suitable fluid-transfer conduits (as indicated in dash-dot lines in FIG. 1). As another example, a portion of hydrogen-producing region 19 (such as portions of one or more reforming catalyst beds) may extend beyond the shell, such as indicated schematically with a dashed line representing an alternative shell configuration in FIG. 1.

As discussed, product hydrogen stream 14 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of oxygen (which is typically delivered as an air stream), and to produce an electric current therefrom. This is schematically illustrated in FIG. 4, in which a fuel cell stack is indicated at 40 and produces an electric current, which is schematically illustrated at 41. In such a configuration, in which the fuel processor or fuel processing assembly is coupled to a fuel cell stack, the resulting system may be referred to as a fuel cell system 42 because it includes a fuel cell stack and a source of fuel for the fuel cell stack. It is within the scope of the present disclosure that fuel processors and heating assemblies according to the present disclosure may be used in applications that do not include a fuel cell stack.

When stream 14 is intended for use in a fuel cell stack, compositions that may damage the fuel cell stack, such as carbon monoxide and carbon dioxide, may be removed from the hydrogen-rich stream, if necessary, such as by purification region 24. For fuel cell stacks, such as proton exchange membrane (PEM) and alkaline fuel cell stacks, the concentration of carbon monoxide is preferably less than 10 ppm (parts per million). Preferably, the concentration of carbon monoxide is less than 5 ppm, and even more preferably, less than 1 ppm. The concentration of carbon dioxide may be greater than that of carbon monoxide. For example, concentrations of less than 25% carbon dioxide may be acceptable in some embodiments. Preferably, the concentration is less than 10%, and even more preferably, less than 1%. While not required, especially preferred concentrations are less than 50 ppm. The acceptable minimum concentrations presented herein are illustrative examples, and concentrations other than those presented herein may be used and are within the scope of the present disclosure. For example, particular users or manufacturers may require minimum or maximum concentration levels or ranges that are different than those identified herein.

Fuel cell stack 40 contains at least one, and typically multiple, fuel cells 44 that are adapted to produce an electric current from an oxidant, such as air, oxygen-enriched air, or oxygen gas, and the portion of the product hydrogen stream 14 delivered thereto. A fuel cell stack typically includes multiple fuel cells joined together between common end plates 48, which contain fluid delivery/removal conduits, although this construction is not required to all embodiments. Examples of suitable fuel cells include proton exchange membrane (PEM) fuel cells and alkaline fuel cells. Others include solid oxide fuel cells, phosphoric acid fuel cells, and molten carbonate fuel cells.

The electric current produced by stack 40 may be used to satisfy the energy demands, or applied load, of at least one associated energy-consuming device 46. Illustrative examples of devices 46 include, but should not be limited to, motor vehicles, recreational vehicles, construction or industrial vehicles, boats or other seacraft, tools, lights or lighting assemblies, appliances (such as household or other appliances), households or other dwellings, offices or other commercial establishments, computers, signaling or communication equipment, battery chargers, etc. Similarly, fuel cell stack 40 may be used to satisfy the power requirements of fuel cell system 42, which may be referred to as the balance-of-plant power requirements of the fuel cell system. It should be understood that device 46 is schematically illustrated in FIG. 4 and is meant to represent one or more devices, or collection of devices, that are adapted to draw electric current from the fuel cell system.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, a hydrogen storage device 50 is shown in dashed lines in FIG. 4. Device 50 is adapted to store at least a portion of product hydrogen stream 14. For example, when the demand for hydrogen gas by stack 40 is less than the hydrogen output of fuel processor 12, the excess hydrogen gas may be stored in device 50. Illustrative examples of suitable hydrogen storage devices include hydride beds and pressurized tanks. Although not required, a benefit of fuel processing assembly 10 or fuel cell system 42 including a supply of stored hydrogen is that this supply may be used to satisfy the hydrogen requirements of stack 40, or the other application for which stream 14 is used, in situations when fuel processor 12 is not able to meet these hydrogen demands. Examples of these situations include when the fuel processor is starting up from a cold, or inactive state, ramping up (being heated and/or pressurized) from an idle state, offline for maintenance or repair, and when the fuel cell stack or application is demanding a greater flow rate of hydrogen gas than the maximum available production from the fuel processor. Additionally or alternatively, the stored hydrogen may also be used as a combustible fuel stream to heat the fuel processing assembly or fuel cell system. Fuel processing assemblies that are not directly associated with a fuel cell stack may still include at least one hydrogen-storage device, thereby enabling the product hydrogen streams from these fuel processing assemblies to also be stored for later use.

Fuel cell system 42 may also include a battery 52 or other suitable electricity-storing device that is adapted to store the electric potential, or power output, produced by stack 40. Similar to the above discussion regarding excess hydrogen, fuel cell stack 40 may produce a power output in excess of that necessary to satisfy the load exerted, or applied, by device 46, including the load required to power fuel cell system 42. In further similarity to the above discussion of excess hydrogen gas, this excess power output may be used in other applications outside of the fuel cell system and/or stored for later use by the fuel cell system. For example, the battery or other storage device may provide power for use by system 42 during startup or other applications in which the system is not producing electricity and/or hydrogen gas. In FIG. 4, flow-regulating structures are generally indicated at 54 and schematically represent any suitable manifolds, valves, controllers, switches and the like for selectively delivering hydrogen and the fuel cell stack's power output to device 50 and battery 52, respectively, and to draw the stored hydrogen and stored power output therefrom.

As also shown in at least FIGS. 1 and 4-6, fuel processing assemblies (and fuel cell systems) according to the present disclosure may include a heating assembly 60 that is adapted to heat at least the hydrogen-producing region, or reforming region, 19 of the fuel processor. In some fuel processing assemblies according to the present disclosure, heating assembly 60 includes a burner assembly 62 and may be referred to as a combustion-based, or combustion-driven, heating assembly. In a combustion-based heating assembly, the heating assembly 60 is adapted to receive at least one fuel stream 64 and to combust the fuel stream in the presence of air to provide a hot combustion stream 66 that may be used to heat at least the hydrogen-producing region 19 of the fuel processor. Stream 66 may also be referred to as a heated exhaust stream. As discussed in more detail herein, air may be delivered to the heating assembly via a variety of mechanisms. In FIG. 5, an air stream 74 is shown in solid lines; however, it is within the scope of the disclosure for the air stream to additionally or alternatively be delivered to the heating assembly with at least one of the fuel streams 64 for the heating assembly 60 and/or drawn from the environment within which the heating assembly is utilized.

It is within the scope of the disclosure that combustion stream 66 may additionally or alternatively be used to heat other portions of the fuel processing assembly and/or fuel cell systems with which heating assembly 60 is used. It is also within the scope of the present disclosure that other configurations and types of heating assemblies 60 may be utilized. As an illustrative example, a heating assembly 60 may be an electrically powered heating assembly that is adapted to heat at least the hydrogen-producing region of the fuel processing assembly by generating heat using at least one heating element, such as a resistive heating element. Therefore, it is not required that heating assembly 60 receive and combust a combustible fuel stream to heat hydrogen-producing region 19 to a suitable hydrogen-producing temperature.

In FIGS. 1 and 4-6, heating assembly 60 is shown in an overlapping relationship with fuel processor 12 to graphically represent that it is within the scope of the disclosure that the heating assembly may be located partially or completely within fuel processor 12, such as being at least partially within shell 68, and/or that at least a portion, or all, of the heating assembly may be located external the fuel processor. In this latter embodiment, the hot combustion gases from the burner assembly will be delivered via suitable heat transfer conduits to the fuel processor or other portion of the system(s) to be heated.

As indicated in dashed lines in FIG. 5, fuel processing assemblies 10 according to the present disclosure may include a vaporization region 69 that is adapted to receive a liquid feed stream 16 (or a liquid component of feed stream 16, such as a stream of water 17 or a stream of a liquid carbon-containing feedstock 18) and to vaporize the feed stream (or portion thereof) prior to delivery to hydrogen-producing region 19 of fuel processor 12. As indicated schematically in FIG. 5, heated combustion stream 66 from the heating assembly may be used to vaporize the feed stream in vaporization region 69 and/or otherwise heat the feed stream. It is within the scope of the disclosure that fuel processor 12 may be constructed without a vaporization region and/or that the fuel processor is adapted to receive a feed stream that is gaseous or that has already been vaporized. It is also within the scope of the present disclosure that vaporization region 69, when present, extends partially or completely outside of shell 68 (when present).

Fuel processors 12, heating assemblies 60, and feedstock delivery systems 22 according to the present disclosure may be configured in any of the arrangements described, illustrated and/or incorporated herein. In some embodiments, features or aspects from one or more of the above described configurations may be combined with each other and/or with additional features described herein. For example, it is within the scope of the present disclosure that fuel processing assemblies 10 that include at least one purification region 24 may (but are not required to) house the hydrogen-producing region 19 and at least a portion of the purification region together in a common housing, with this housing optionally being located within the shell 68 of the fuel processor. This is schematically illustrated in FIG. 6, in which reference numeral 25 generally indicates a hydrogen-producing region 19 of a fuel processor, with the hydrogen-producing region being contained within a housing, or vessel, 27 that contains at least the reforming (or other) catalyst 23 used to produce the mixed gas stream from the feed stream that is delivered to the hydrogen-producing region.

As indicated in dashed lines in FIG. 6, shell 27 (and thereby region 25) may, but is not required to, also include a purification region 24. For example, as illustrated in dashed lines in FIG. 6, the purification region, when present in the housing, may include one or more hydrogen-selective membranes 30 and/or a chemical carbon monoxide removal assembly 32. Accordingly, region 25 may be described as a hydrogen-producing and purifying region when it contains both a hydrogen-producing region 19 and a purification region 24. It is within the scope of the disclosure that any of the regions 19 and 24 described, illustrated and/or incorporated herein may be used in region 25. When region 25 does not include a purification region, it may simply be described as a hydrogen-producing region 19 that includes a housing 27. When housing 27 includes a purification region 24, it is still within the scope of the present disclosure that the fuel processing assembly may include one or more additional purification regions (such as which may include the same or different purification devices/mechanisms) external (i.e., downstream from) housing 27. The fuel processing assemblies illustrated herein thereby include a hydrogen-producing region that is contained in a housing, with this housing optionally also containing a purification region. As also illustrated in FIG. 6, it is within the scope of the present disclosure that vaporization region 69, when present, may extend partially or completely within housing 27.

Figure 7:
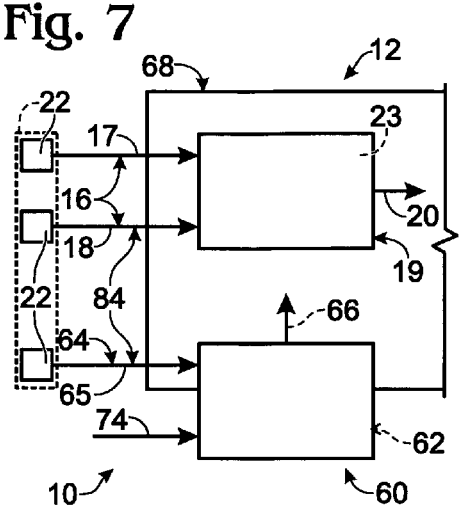
FIG. 7 is a schematic view of a fuel processing assembly according to the present disclosure in which the hydrogen-producing region and the feedstock delivery system both receive the same liquid carbon-containing feedstock.

Many hydrogen-producing fuel processors, such as steam and autothermal reformers and pyrolysis and partial oxidation reactors, require a carbon-containing feedstock that is used in the hydrogen-producing reaction, and then a separate fuel stream, which typically also includes a carbon-containing feedstock, that is used as a fuel source for the heating assembly. As such, these conventional fuel processing assemblies require a separate source, pump, or other delivery assembly, transport conduits, and flow-regulating devices, etc. According to an aspect of the present disclosure, which is not required to all embodiments, a liquid-phase carbon-containing feedstock 84 may be used for both carbon-containing feedstock portion 18 of feed stream 16 for reforming region 19 and carbon-containing feedstock portion 65 of fuel stream 64 for heating assembly 60, such as schematically illustrated in FIG. 7. This dual use of carbon-containing feedstock 84 is not required to all embodiments of the present disclosure. FIG. 7 also provides a graphical illustration of a hydrogen-producing fuel processing assembly that includes more than one feedstock delivery system 22, such as a delivery system 22 that is adapted to deliver a feed stream containing water 17, a feed stream containing carbon-containing feedstock 18, and/or a feedstock delivery system 22 that is adapted to deliver fuel stream 64. As illustrated in dashed lines in FIG. 7, it is within the scope of the present disclosure that the previous example of three feedstock delivery systems may additionally or alternatively be implemented as a single feedstock delivery system 22, such as which may include more than one pump and/or produce more than one outlet stream. It is further within the scope of the present disclosure that not all liquid streams to the fuel processing assembly are delivered by a feedstock delivery system 22. Instead, one or more of the streams may be delivered by a different mechanism or delivery system.

In the illustrative example shown in FIG. 7, liquid carbon-containing feedstock 84 is delivered to both heating assembly 60 and hydrogen-producing region 19. FIG. 7 has been shown in a fragmentary view because fuel processor 12 may have a wide variety of configurations, such as configurations that do not include a purification region, that utilize more than one type or number of purification mechanism, etc. It is intended that the fragmentary fuel processor shown in FIG. 7 (and subsequent figures) schematically represents any of these configurations, as well as any of the steam reformers and other fuel processors described, illustrated and/or incorporated herein.

Figure 8:
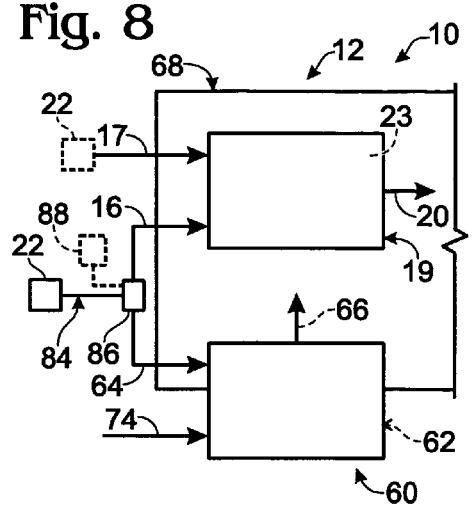
FIG. 8 is a schematic view showing a variation of the fuel processing assembly of FIG. 7, with a carbon-containing feedstock being delivered to the hydrogen-producing region and the burner assembly from the same supply stream.

FIG. 8 is similar to FIG. 7, except that the liquid carbon-containing feedstock 84 is delivered as a single stream to valve assembly 86, in which the carbon-containing feedstock is selectively delivered to at least one of the heating assembly and the hydrogen-producing region. Valve assembly 86 may include any suitable structure for selectively dividing the stream of carbon-containing feedstock between the heating assembly and the hydrogen-producing region. The range of possible configurations includes the heating assembly receiving all of the carbon-containing feedstock, the hydrogen-producing region receiving all of the carbon-containing feedstock, or both the heating assembly and the hydrogen-producing region receiving carbon-containing feedstock. As discussed herein, the distribution of the carbon-containing feedstock depends at least in part upon the particular carbon-containing feedstock being used, whether byproduct stream 28 is also used as a fuel for at least a portion of heating assembly 60, and the particular mode of operation of the fuel processor, such as an idle mode, a startup mode, or a hydrogen-producing mode.

The distribution of liquid carbon-containing feedstock 84 between the hydrogen-producing region and the heating assembly may be manually controlled. However, in many embodiments, it may be desirable for the distribution to be predetermined and/or at least partially automated, such as by including a controller 88 that selectively regulates the delivery of feedstock 84 between the hydrogen-producing region and the heating assembly. An example of a suitable controller for a steam reforming fuel processor is disclosed in U.S. Pat. No. 6,383,670, the complete disclosure of which is hereby incorporated by reference. In some embodiments, controller 88 and/or valve assembly 86 may be configured to allow a predetermined initial volume of carbon-containing feedstock into heating assembly 60, as will be discussed in greater detail herein.

Figure 9:
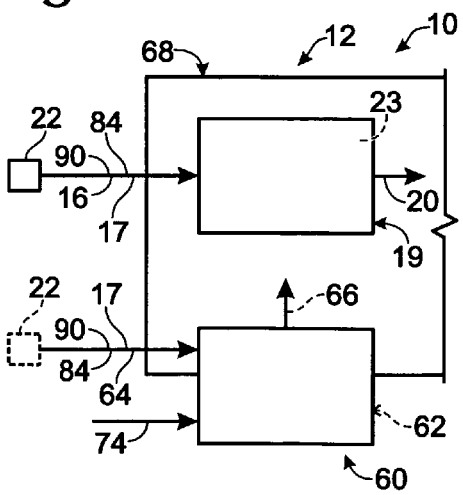
FIG. 9 is a schematic view of a fuel processing assembly according to the present disclosure in which the hydrogen-producing region and the burner assembly both receive fuel, or feed, streams containing water and a liquid carbon-containing feedstock.
Figure 10:
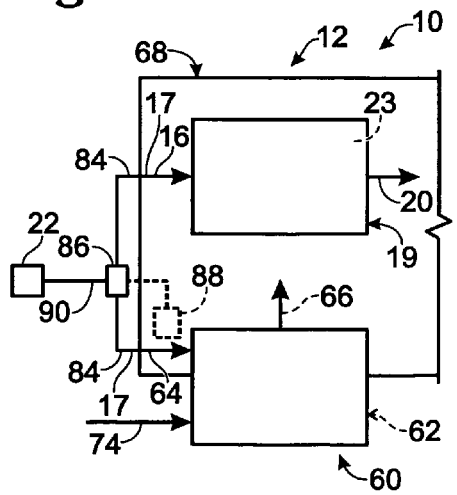
FIG. 10 is a schematic view showing a variation of the fuel processing assembly of FIG. 9, with the hydrogen-producing region and the burner assembly both receiving fuel, or feed, streams containing water and a carbon-containing feedstock from the same supply stream.

As discussed previously, in the context of a steam reformer or other fuel processor that produces hydrogen gas from water and a carbon-containing feedstock, feed stream 16 may be at least substantially, and typically entirely, comprised of a mixture of water and a liquid-phase carbon-containing feedstock 84 that is preferably miscible in, or with, water. As such, a single (composite) feed stream 90 containing water 17 and carbon-containing feedstock 84 can be consumed as both the hydrogen-producing feed stream 16 for the reforming reaction, as well as the heating assembly fuel stream 64. Further reduction in the supplies, delivery systems, flow regulators, delivery conduits and the like may be achieved according to another aspect of the present disclosure by feed stream 16 and fuel stream 64 both containing the same liquid carbon-containing feedstock 84 and water 17, with the carbon-containing feedstock preferably being miscible in water. This is schematically illustrated in FIGS. 9 and 10, in which this composite stream is indicated at 90. Streams 16 and 64 may have nearly, or completely, identical compositions, and may be entirely formed from stream 90. It is within the scope of the disclosure, however, that at least one of streams 16 and 64 may have at least one additional component or additional amount of water or carbon-containing feedstock added thereto prior to consumption of the stream by the heating assembly or hydrogen-producing region. Similarly, it is within the scope of the present disclosure that additional streams may deliver additional components or additional amounts of water or carbon-containing feedstock to the heating assembly or the fuel processor.

Similar to the previously discussed alternatives of FIGS. 7 and 8 (where only the carbon-containing feedstock component 84 of feed stream 16 was delivered to heating assembly 60 rather than both the carbon-containing feedstock 84 and the water 17), composite feed stream 90 may be selectively delivered to heating assembly 60 and hydrogen-producing region 19 in separate streams from the same source or from different sources, as schematically illustrated in FIG. 9. Alternatively, and as schematically illustrated in FIG. 10, a single composite feed stream 90 may be delivered to the fuel processing assembly, and more specifically to a valve assembly 86, where the stream is selectively divided between the heating assembly and the hydrogen-producing region. A controller 88, which may be a manual controller or a computerized or other electronic controller or preprogrammed controller, is also shown in dashed lines in FIG. 10. Controller 88 may be located internal or external fuel processor 12, and/or may include both internal and external components.

The relative amounts of water 17 and liquid carbon-containing feedstock 84 in composite feed stream 90 may vary within the scope of the present disclosure. For example, the ratio may depend upon such factors as the particular carbon-containing feedstock being used, the hydrogen-producing mechanism being used in the fuel processor, user preferences, the catalyst being utilized, the demand for hydrogen gas, the efficiency of the reforming catalyst, etc. The relative concentrations of these components may be expressed in terms of a ratio of water to carbon. When feedstock 84 is methanol, a 1:1 molar ratio of steam to carbon has proven effective. When feedstock 84 is ethanol, a ratio of 2-3:1 has proven effective. When feedstock 84 is a hydrocarbon, a ratio of approximately 3:1 is typically used. However, the illustrative ratios described above are not meant to be exclusive ratios within the scope of the disclosure, and others, including greater and lesser ratios, may be used.

Figure 11:
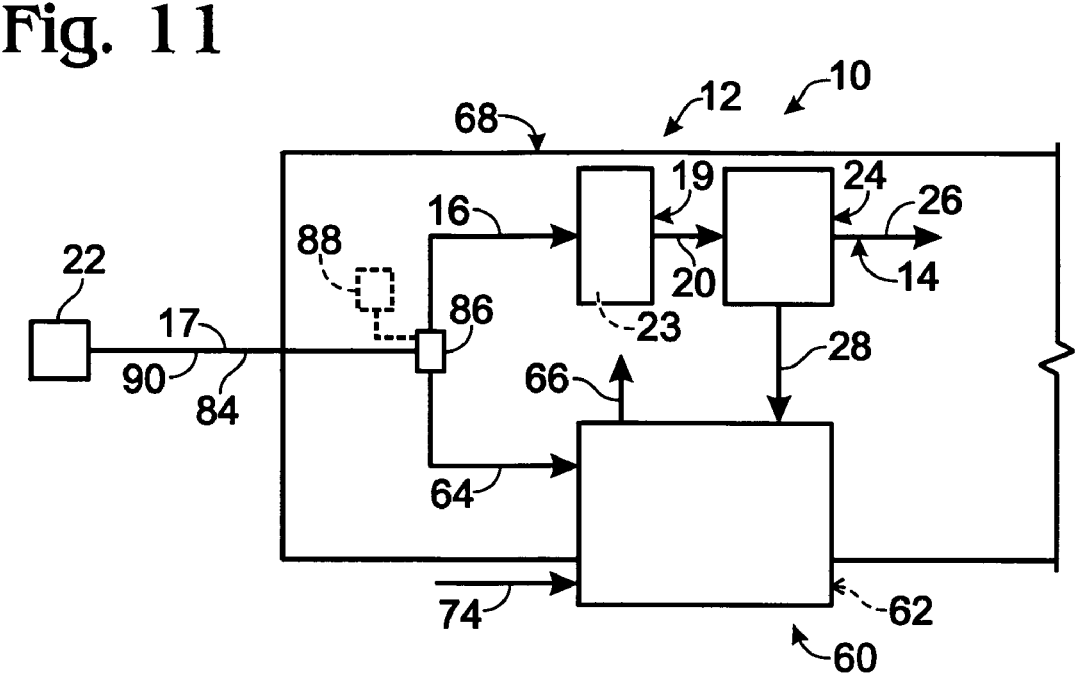
FIG. 11 is a schematic view showing another variation of the fuel processing assemblies of FIGS. 9 and 10.

In FIG. 11, a variation of the configuration of FIG. 10 is shown to illustrate that it is within the scope of the present disclosure that valve assembly 86 may be located either internal or external fuel processor 12. FIG. 11 also illustrates that when the fuel processor includes or is otherwise associated with a purification region 24 that produces a gaseous byproduct stream 28, the gaseous byproduct stream 28 may be delivered to the heating assembly to be used as a gaseous fuel for the heating assembly. This gaseous fuel may supplement the liquid fuel discussed above (such as carbon-containing feedstock 84 or composite feed stream 90), or may itself contain sufficient heating value for certain steam reformers or other fuel processors and/or certain operating configurations of the fuel processors.

Illustrative examples of hydrogen-producing fuel cell systems 42, hydrogen-producing fuel processing assemblies 10, and feedstock delivery systems 22 have been schematically illustrated in FIGS. 1-11. These systems may include additional components, such as air/oxidant supplies and delivery systems, heat exchange assemblies and/or sources, controllers, sensors, valves and other flow controllers, power management modules, etc. It is within the scope of the present disclosure to selectively include one or more of these components. Similarly, although a single fuel processor 12 and/or a single fuel cell stack 40 are shown in FIGS. 1-11, it is within the scope of the disclosure that more than one of either or both of these components may be used.

INDUSTRIAL APPLICABILITY

The feedstock delivery systems, and hydrogen-producing fuel processing and fuel cell systems containing the same that are disclosed herein are applicable to the hydrogen- and energy-production industries, including the fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the disclosure or subsequently filed claims recite "a" or "a first" element or the equivalent thereof, it should be within the scope of the present inventions that such disclosure or claims may be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for delivering feedstock to a hydrogen-producing fuel cell system that includes at least a hydrogen-producing region adapted to produce a stream containing hydrogen gas from at least one feedstock, and a fuel cell stack adapted to produce a power output from an oxidant and hydrogen gas produced in the hydrogen-producing region, the method comprising:

drawing a liquid stream from a supply containing at least one carbon-containing feedstock for the hydrogen-producing region of a hydrogen-producing fuel cell system;

pumping at a constant flow rate regardless of changes in demand for hydrogen production by the hydrogen-producing region when the hydrogen-producing region is in a hydrogen-producing operating state, a flow of the liquid stream through an outlet conduit that is in fluid communication with a delivery conduit and a first portion of a recycle conduit, wherein the delivery conduit is in fluid communication with the hydrogen-producing region of the hydrogen-producing fuel cell system, wherein the recycle conduit is adapted to provide a flow path to return at least a portion of the liquid stream to at least one of the supply and a location upstream from a delivery mechanism that is adapted to propel the liquid stream to the outlet conduit, and further wherein the pumping step produces a flow rate of the liquid stream that exceeds a threshold flow rate through the hydrogen-producing region, with an excess portion of the flow flowing into the recycle conduit;

regulating the distribution of the flow between the delivery conduit and the recycle conduit, wherein the regulating includes creating backpressure in the recycle conduit with a flow restrictor that separates the recycle conduit into at least a first portion that extends between the outlet conduit and the flow restrictor and a second portion that extends from the flow restrictor, wherein the regulating further includes selectively permitting the excess portion of the flow to bypass the flow restrictor by flowing through a bypass conduit in fluid communication with portions of the recycle conduit upstream and downstream of the flow restrictor;

receiving at least a portion of the flow from the delivery conduit in the hydrogen-producing region and producing a stream containing hydrogen gas therefrom; and producing an electrical power output from an oxidant and at least a portion of the stream containing hydrogen gas.

2. The method of claim 1, wherein the method includes automatically regulating distribution of the flow of the liquid stream through the outlet conduit between the delivery conduit and the recycle conduit.

3. The method of claim 1, wherein the selectively permitting includes restricting the liquid stream from flowing through the bypass conduit until the pressure of the flow exceeds a threshold recycle pressure.

4. The method of claim 3, wherein the threshold recycle pressure is less than a threshold delivery pressure for the portion of the flow that is delivered to the hydrogen-producing region.

5. The method of claim 3, wherein the selectively permitting includes permitting flow of the liquid stream through the bypass conduit at least until the pressure of the flow is less than the threshold recycle pressure and thereafter restricting further flow of the liquid stream through the bypass conduit.

6. The method of claim 1, wherein the selectively permitting includes utilizing a pressure-actuated valve that is adapted to be selectively configured between a closed configuration, in which the pressure-actuated valve restricts flow through the bypass conduit, and an actuated configuration, in which the pressure-actuated valve permits flow of the excess portion through the bypass conduit, and further wherein the pressure-actuated valve is biased to the closed configuration.

7. The method of claim 6, wherein the pressure-actuated valve is adapted to transition to the actuated configuration when the pressure of the flow exceeds a threshold recycle pressure.

8. The method of claim 1, wherein the flow restrictor includes a restrictive orifice.

9. The method of claim 1, wherein the hydrogen-producing region is adapted to receive up to a threshold portion of the flow that is less than 100% of the flow.

10. The method of claim 1, wherein the liquid stream contains water and the carbon-containing feedstock.

11. The method of claim 10, wherein the hydrogen-producing region includes a reforming catalyst that is adapted to produce a mixed gas stream that contains hydrogen gas and other gases.

12. The method of claim 11, wherein the method further includes removing at least a portion of the other gases from the mixed gas stream.

\* \* \* \* \*

UNITED STATES PATENT AND TRADEMARK OFFICE
CERTIFICATE OF CORRECTION

PATENT NO. : 7,601,302 B2
APPLICATION NO. : 11/228637
DATED : October 13, 2009
INVENTOR(S) : Edlund et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 940 days.

Signed and Sealed this

Fifth Day of October, 2010

David J. Kappos
*Director of the United States Patent and Trademark Office*